(12) United States Patent
Lin

(10) Patent No.: US 8,113,525 B2
(45) Date of Patent: Feb. 14, 2012

(54) FOLDING DEVICE FOR SCOOTERS

(76) Inventor: Henkel Lin, Taichung (TW)

( * ) Notice: Subject to any disclaimer, the term of this patent is extended or adjusted under 35 U.S.C. 154(b) by 414 days.

(21) Appl. No.: 12/462,504

(22) Filed: Aug. 5, 2009

(65) Prior Publication Data

US 2011/0031710 A1 Feb. 10, 2011

(51) Int. Cl.
*B62M 1/00* (2010.01)
(52) U.S. Cl. ................ 280/87.041; 280/87.05
(58) Field of Classification Search ............ 280/87.041, 280/87.05, 14.27, 14.28, 287; 180/221, 220, 180/65.1; 403/96, 98
See application file for complete search history.

(56) References Cited

U.S. PATENT DOCUMENTS

| | | | |
|---|---|---|---|
| 6,276,701 B1 * | 8/2001 | Chen | 280/87.05 |
| 6,378,880 B1 * | 4/2002 | Lin | 280/87.05 |
| 6,390,483 B1 * | 5/2002 | Hsu et al. | 280/87.041 |
| 6,848,697 B2 * | 2/2005 | Lan | 280/87.05 |
| 7,011,319 B2 * | 3/2006 | Lu | 280/87.041 |
| 7,040,443 B1 * | 5/2006 | Roth et al. | 180/221 |
| 7,407,172 B2 * | 8/2008 | Ka Ming | 280/87.041 |
| 7,419,171 B1 * | 9/2008 | Ka Ming | 280/87.041 |
| 7,559,561 B2 * | 7/2009 | Tsai | 280/87.05 |
| 7,712,937 B2 * | 5/2010 | Grossman | 362/545 |
| 2003/0001351 A1 * | 1/2003 | Schauble et al. | 280/87.05 |

* cited by examiner

*Primary Examiner* — Hau Phan
(74) *Attorney, Agent, or Firm* — Charles E. Baxley

(57) ABSTRACT

A scooter has a folding device provided to selectively pivotally connect to a T-shaped handle bar and a platform. The folding device for scooters comprises a pair of side plates respectively secured to a lower portion of a T-shaped handle bar, a seat secured between the pair of side plates and an engaging unit mounted onto an underside of the platform. The engaging unit is selectively engaged to the seat to fix the relative connection between the handle bar and the platform.

8 Claims, 4 Drawing Sheets

FOLDING DEVICE FOR SCOOTERS

BACKGROUND OF THE INVENTION

1. Field of the Invention

The present invention relates to folding device, and more particularly to a folding device for scooters.

2. Description of Related Art

A scooter has an L-shaped structure including a vertical handle bar and a platform connected to a lower end of the handle bar. For easily stored and carried, a folding device is provided to connect the handle bar and the platform such that the scooter has an I-shaped structure after being folded. As usual, the folding device uses a plug and a socket to selectively fix the connection between the handle bar and the platform. The operate ways of the plug and the socket are followed.

1. Quick release device: a quick release device can quickly lock or release the connection between the handle bar and the platform. However, the quick release device is expensive. Accordingly, the cost of the scooter is raised.

2. Machine transmission: in this way, a puller is provided to pull the plug and make the plug being disengaged from the socket. The puller usually laterally or upwardly mounted onto the folding device for an easy operation. As a result, the puller may be hooked to an object or have an accident operation from the user during riding. It is very dangerous when the plug is suddenly disengaged from the socket.

3. Direct operation by hand: in this way, the plug usually laterally extends through the folding device. However, user's hand is situated folding route of the handle bar such that the user's hand may be hurt due to the handle bar that suddenly moves toward the platform when the plug is disengaged from the socket.

The present invention has arisen to mitigate and/or obviate the disadvantages of the conventional folding devices for scooters.

SUMMARY OF THE INVENTION

The main objective of the present invention is to provide an improved folding device for scooters, which has a low cast and a stable structure.

To achieve the objective, the folding device in accordance with the present invention comprises a pair of side plates securely connected to a lower portion of a handle bar of the scooter. Each side plate has an upper edge divided into a curved section and a linear section near the handle bar. The platform of the scooter is pivotally connected to the folding device by a pin that laterally extends through the folding device and a front of the platform.

A seat is secured between the pair of side plates and has an outline relative to that of each of the pair of plates. A first mortise and a second mortise are respectively defined in two opposite ends of the curved portion.

An engaging unit is mounted onto an underside of the platform. The engaging unit includes a channel secured on the underside of the platform along an axis of the platform to define a closed channel for slidably receiving a plug that is reciprocally moved relative to the channel beam. The plug has a tenon extending therefrom toward the seat and selectively received in the first mortise and the second mortise.

Further benefits and advantages of the present invention will become apparent after a careful reading of the detailed description with appropriate reference to the accompanying drawings.

DETAILED DESCRIPTION OF THE INVENTION

Figure 1:
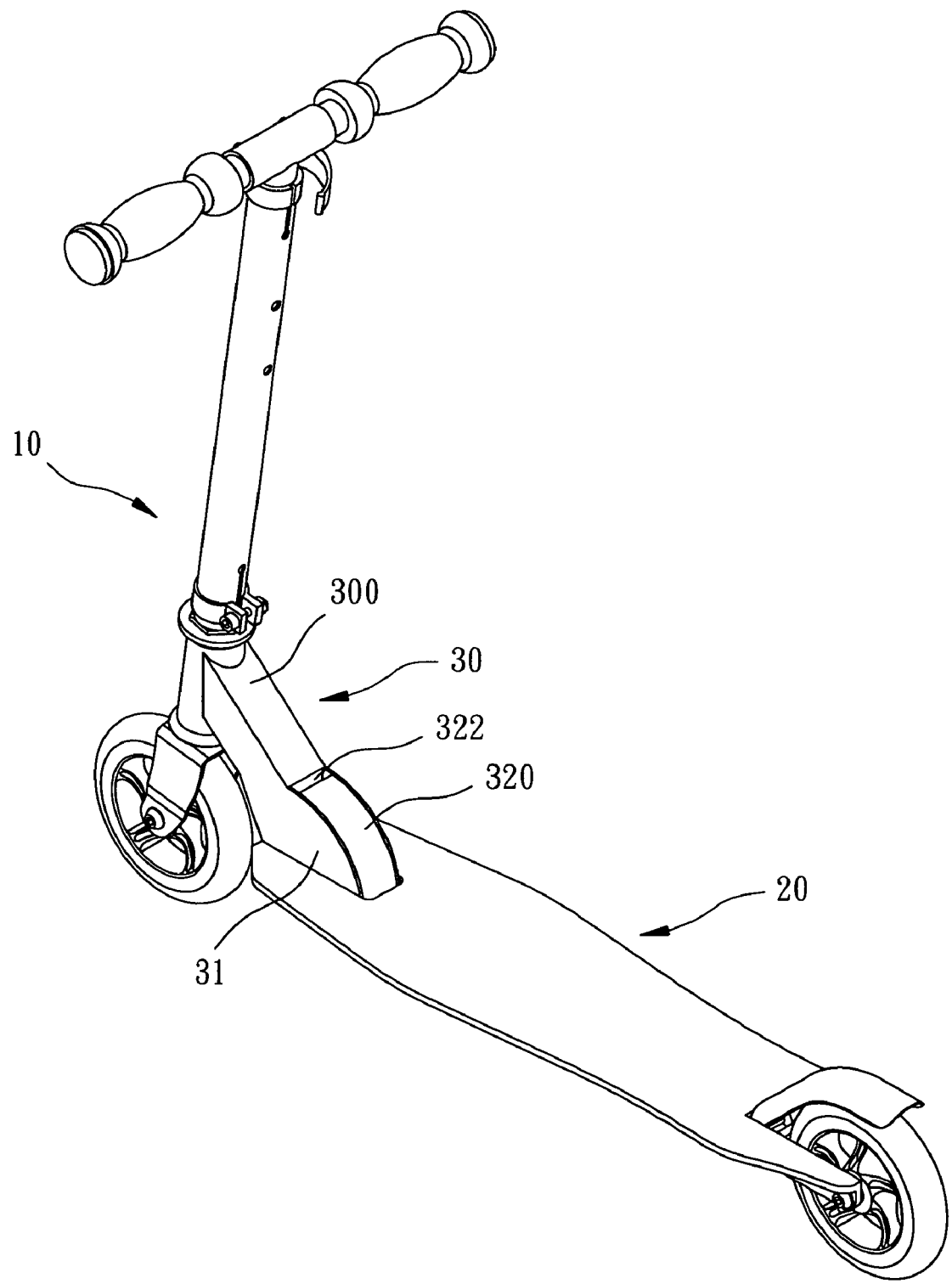
FIG. 1 is a perspective view of a scooter with a folding device in accordance with the present invention.
Figure 2:
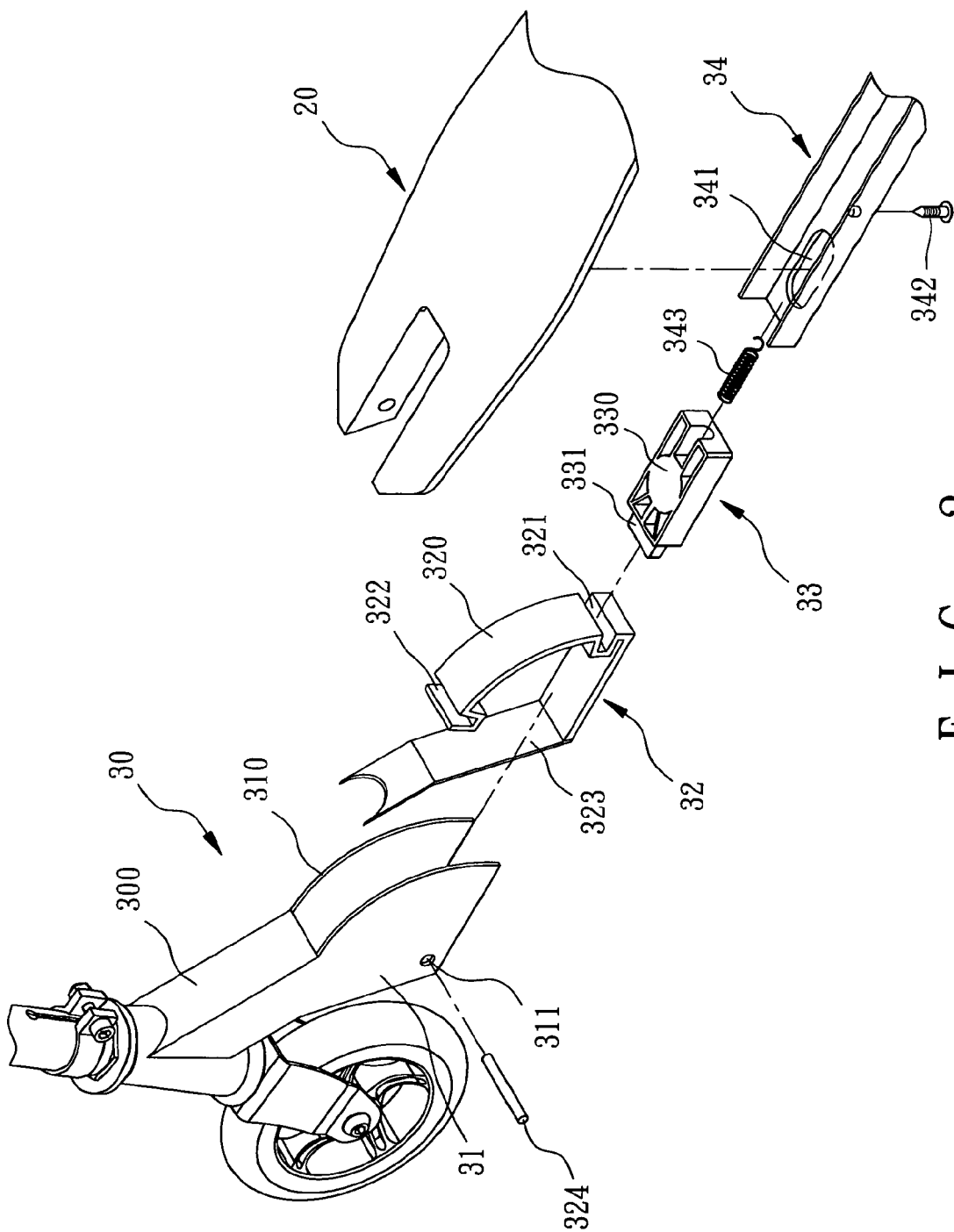
FIG. 2 is an exploded perspective view of the folding device in accordance with the present invention.
Figure 3:
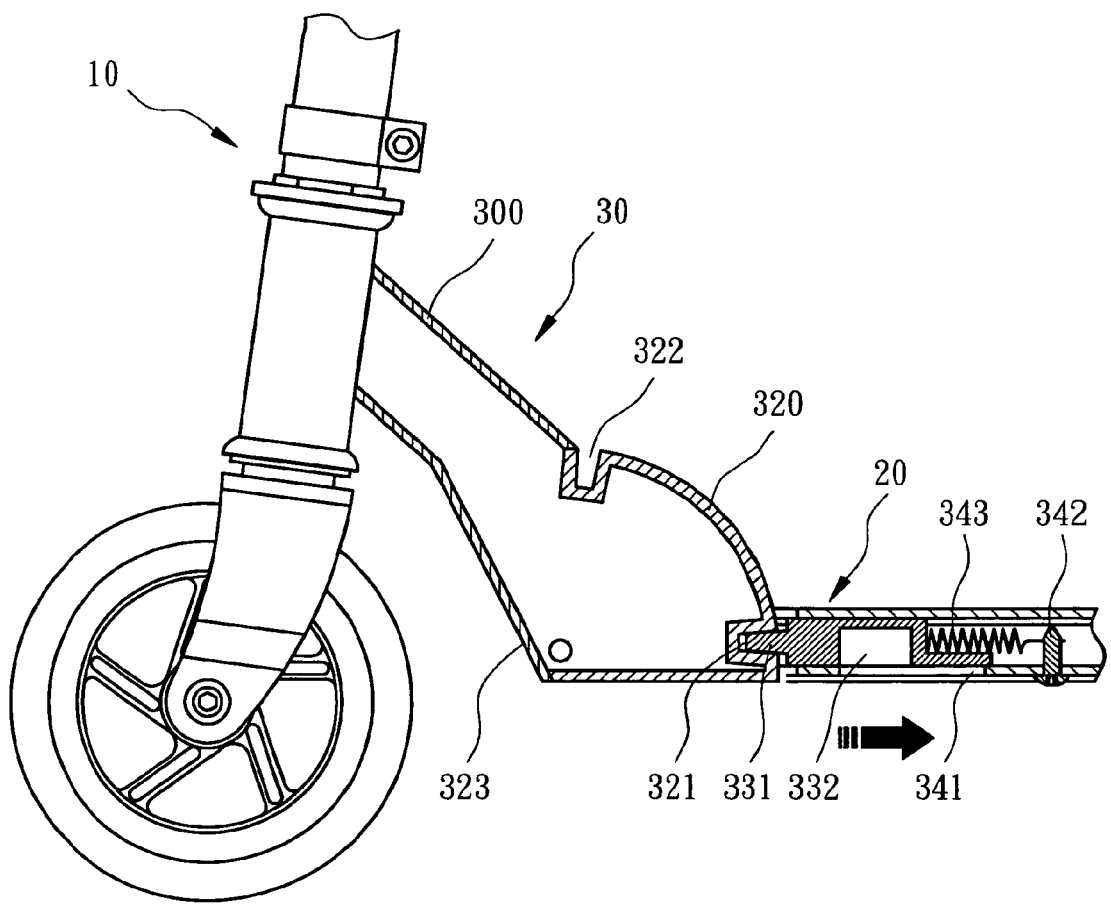
FIG. 3 is a cross-sectional view of the folding device in accordance with the present invention.

Referring to the drawings and initially to FIGS. 1-3, a scooter has a folding device provided to selectively pivotally connect to a T-shaped handle bar (10) and a platform (20). The folding device (30) for scooters in accordance with the present invention comprises a pair of side plates (31) respectively adapted to be secured to a lower portion of a T-shaped handle bar (10), a seat (32) secured between the pair of side plates (31) and an engaging unit (33) adapted to be mounted onto an underside of the platform (20). The engaging unit (33) is selectively engaged to the seat (32) to fix the relative connection between the handle bar (10) and the platform (20).

Each side plate (31) has an upper edge divided into a curved section (310) and a linear section near the handle bar (10). A pivot hole (311) is defined in a lower edge of each of the pair of side plates (31), wherein the pivot hole (311) is situated in a center of the curved section (310). In the preferred embodiment of the present invention, the central angle of the curved section (310) is 90 degrees. A connecting plate (300) is adapted to be connected to the handle bar (10) and has two opposite sides respectively connected to the linear section of each of the pair of side plates (31) for enhancing the structure of the pair of side plates (31). The connecting plate (300) and the two side plates (31) are made of metal sheet and connected to one another by welding. In addition, the connecting plate (300) can be integrally formed with the two side plates (31) to form an integral sheetmetal structure.

The seat (32) is an integral sheetmetal structure, and welded to the two side plates (32) and the connecting plate (300). The seat (32) has an outline relative to that of each of the two side plates (31). The seat (32) is formed with a curved portion (320) corresponding to the curved section (310) of each of the two side plates (31). A first mortise (321) and a second mortise (322) are respectively defined in two opposite ends of the curved portion (320). The platform (20) is pivotally connected to the folding device (30) by a pin that laterally extends through the pivot hole (311) and a front end of the platform (20). The seat (32) has a tongue (323) extending from a lower portion thereof. The tongue (323) has a free end adapted to be weld to the handle bar (10) and two opposite sides respectively welded to a lower edge of a corresponding one of the two side plates (31) for enhancing the stricture of the folding device (30) is accordance with the present invention.

The engaging unit (33) includes a channel beam (34) having two opposite sides respectively secured on the underside of the platform (20) along an axis of the platform (20) such that a closed channel is defined between the platform (20) and the channel beam (34) for slidably receiving a plug (330). In addition, the channel beam (34) also enhances the structure of the platform (20). The channel beam (34) sequentially has an aperture (341) defined therein and a bolt (342) screwed therethrough relative to the seat (32). A compressive spring (343) has two opposite ends respectively connected to the bolt (342) and the plug (330). The plug (330) has a tenon (331) extending therefrom toward the seat (32). The tenon (331) is selectively received in the first mortise (321)/the second mortise (322). The plug (330) has a recess (332) defined in an underside thereof and communicating with the aperture (341) for user to easily operate the plug (330) through the aperture (341).

With reference to FIG. 3, the tenon (331) is inserted into the first mortise (321) due to a restitution force of the spring (343) such that an angle about 90 degrees is formed between the handle bar (10) and the platform (20) when the scooter is in a riding condition.

Figure 4:
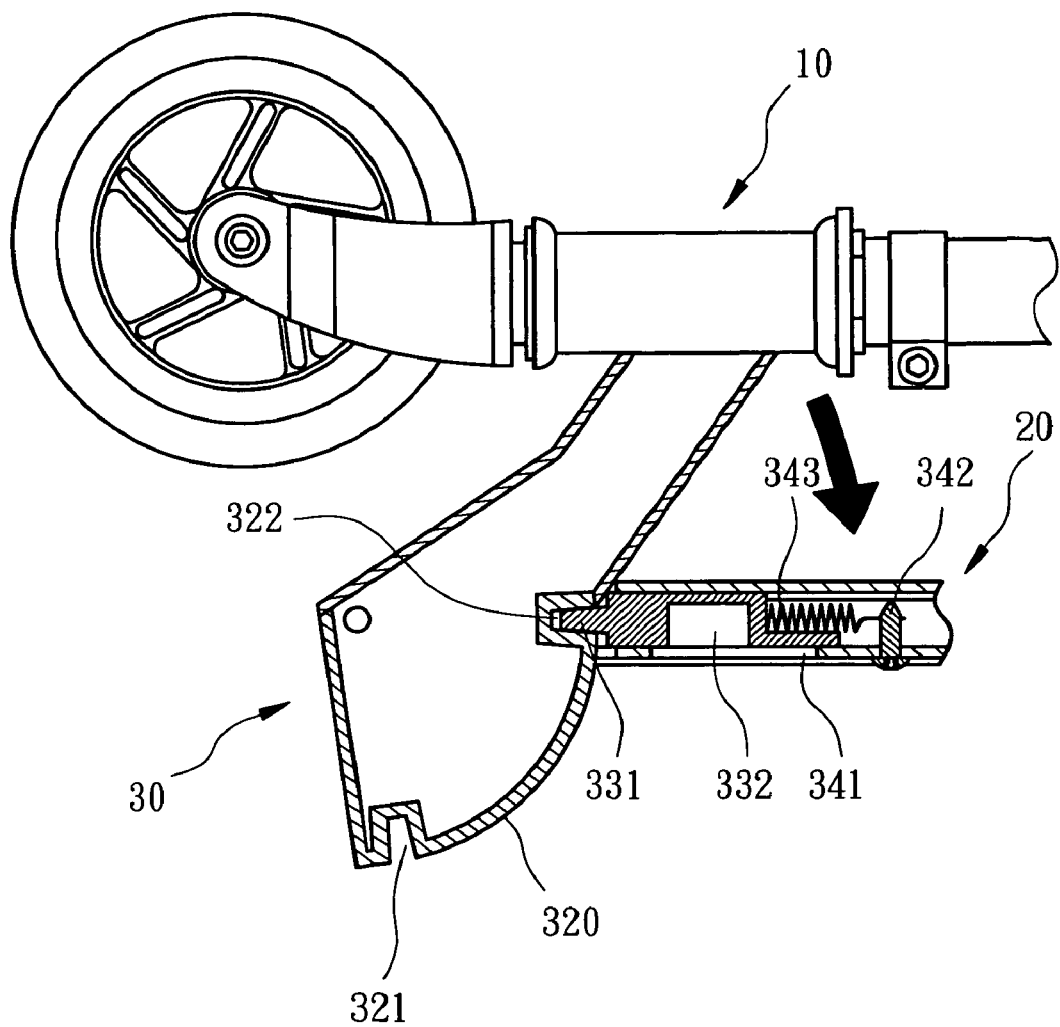
FIG. 4 is an operational view in cross-section of the folding device in accordance with the present invention.

With reference to FIGS. 3 and 4, when folding the scooter, the user can easily and backward pull the plug (330) to make the tenon (331) disengaged from the first mortise (321) and compress the spring (343). The platform (20) can be pivoted relative the folding device (30) and the tenon (331) is moved along the curved portion (320) of the seat (32) when folding the scooter. The tenon (331) automatically inserts into the second mortise (322) due to the restitution force of the spring (343) when the tenon (331) linearly corresponds to the second mortise (322). As shown in FIG. 4, the handle bar (10) is parallel to the platform (20) after the scooter being folded.

As described above, the folding device in accordance with the present invention has the following advantages.

1. The plug (330) is mounted under the platform (20) and received in the channel beam (34) such that an improper force can not actuate the plug (330) to make the tenon (331) being disengaged from the first mortise (321) during operating. Consequently, the safety of scooter is promoted.

2. The plug (330) of the present invention is mounted under the platform (20) such that the user's hand, which operates the plug (330), is under the platform (20). As a result, the falling handle bar (10) can nut hurt user's hand.

3. The channel beam (34) is co-axially mounted on the underside of the platform (20) such that the channel beam (34) can enhance the structure of the platform (20).

Although the invention has been explained in relation to its preferred embodiment, it is to be understood that many other possible modifications and variations can be made without departing from the spirit and scope of the invention as hereinafter claimed.

What is claimed is:

1. A folding device for scooters, comprising:
a pair of side plates adapted to be securely connected to a lower portion of a handle bar of the scooter, each side plate having an upper edge divided into a curved section and a linear section near the handle bar, a pivot hole defined in a lower edge of each of the pair of the side plates, wherein the pivot hole is situated in a center of the curved section and the platform of the scooter is pivotally connected to the folding device by a pin that laterally extends through the pivot hole and a front of the platform, a connecting plate adapted to be connected to the handle and having two opposite sides respectively connected to the linear section of each of the pair of side plates for enhancing the structure of the pair of side plates;
a seat secured between the pair of side plates, the seat respectively connected to the pair of side plates and the connecting plate, the seat having an outline relative to that of each of the pair of plates, the seat formed with a curved portion corresponding to the curved section of each of the pair of side plates, a first mortise and a second mortise respectively defined in two opposite ends of the curved portion; and
an engaging unit adapted to be mounted onto an underside of the platform, the engaging unit including a channel beam having two opposite sides respectively secured on the underside of the platform along an axis of the platform, such that a closed channel is defined between the platform and the channel beam for slidably receiving a plug, the channel beam sequentially having an aperture defined therein and a bolt screwed therethrough relative to the seat, a compressive spring having two opposite ends respectively connected to the bolt and the plug, the plug having a tenon extending therefrom toward the seat, the tenon selectively received in the first mortise and the second mortise, the plug having a recess defined in an underside thereof and communicating with the aperture for user to easily operate the plug through the aperture.

2. The folding device as claimed in claim 1, wherein the central angle of the curved section is 90 degrees.

3. The folding device as claimed in claim 2, wherein the seat has a tongue extending from a lower portion thereof, the tongue having a free end adapted to be securely connected to the handle bar and two opposite sides respectively connected to a lower edge of a corresponding on of the pair of side plates for enhancing the structure of the folding device.

4. The folding device as claimed in claim 3, wherein the connecting plate is integrally formed with the pair of side plate to form an integral sheetmetal structure.

5. The folding device as claimed in claim 2, wherein the connecting plate is integrally formed with the pair of side plate to form an integral sheetmetal structure.

6. The folding device as claimed in claim 1, wherein the seat has a tongue extending from a lower portion thereof, the tongue having a free end adapted to be securely connected to the handle bar and two opposite sides respectively connected to a lower edge of a corresponding on of the pair of side plates for enhancing the structure of the folding device.

7. The folding device as claimed in claim 6, wherein the connecting plate is integrally formed with the pair of side plate to form an integral sheetmetal structure.

8. The folding device as claimed in claim 1, wherein the connecting plate is integrally formed with the pair of side plate to form an integral sheetmetal structure.

* * * * *